United States Patent [19]
Tognazzini

[11] Patent Number: 5,850,077
[45] Date of Patent: Dec. 15, 1998

[54] PORTABLE CARD AUTHORIZER

[75] Inventor: Bruce Tognazzini, Woodside, Calif.

[73] Assignee: Sun Microsystems, Inc., Palo Alto, Calif.

[21] Appl. No.: 645,009

[22] Filed: May 9, 1996

[51] Int. Cl.⁶ .................................................. G06K 5/00
[52] U.S. Cl. ........................................................ 235/380
[58] Field of Search ............................................ 235/380

[56] References Cited

U.S. PATENT DOCUMENTS

| | | | |
|---|---|---|---|
| 3,636,315 | 1/1972 | Comeau | 386/46 |
| 4,415,065 | 11/1983 | Sandstedt | 235/383 |
| 5,010,485 | 4/1991 | Bigari | 235/379 |
| 5,202,825 | 4/1993 | Miller et al. | 395/221 |
| 5,237,487 | 8/1993 | Dittmer | 235/380 |
| 5,256,863 | 10/1993 | Ferguson et al. | 380/24 |
| 5,386,106 | 1/1995 | Kumar | 235/380 |
| 5,387,784 | 2/1995 | Serradin | 361/729 |
| 5,561,282 | 10/1996 | Price et al. | 235/380 |

*Primary Examiner*—Anita Pellman Gross
*Assistant Examiner*—Mark Tremblay
*Attorney, Agent, or Firm*—McDermott, Will & Emery

[57] ABSTRACT

A system for authorizing card purchases includes a portable unit having a card reader for reading a card authorization code and a first wireless transceiver for transmitting the card authorization code to a base unit. The base unit has a second wireless transceiver. Responsive to receipt of the transmitted card authorization code, the base unit causes the second wireless transceiver to transmit a credit approval or denial.

1 Claim, 10 Drawing Sheets

PORTABLE CARD AUTHORIZER

BACKGROUND OF INVENTION

1. Field of the Invention

The present invention relates generally to credit card type authorizations. More particularly, the present invention provides a system, method, computer and programming instructions, for authorizing card purchases. The invention is particularly useful in authorizing card purchases of meals in a restaurant or other similar type establishment.

2. Description of the Related Art

Card transactions have been increasing dramatically. In addition to transactions using Visa™, MasterCard™ and Discover™, card transactions can now be made with what are commonly characterized as debit cards and hotel keycards. It is likely that card transactions will continue to increase in the future both domestically and internationally.

Advances in automating card transaction processing have been made. For example, magnetic strips are now included on most cards to store the customer's card authorization code. Readers have been developed which can scan the magnetic strip to read the card authorization code by simply sliding the card through a slot in the card reader.

Conventional card readers are typically fixed or hardwired to a cash register. The readers often are positioned so that the cashier must take possession of the customer's card and slide it through the reader. Even with those units which allow the customer to personally slide the card through the card reader, the customer must physically bring the card to the cash register area in order to have the card authorization code read by the card reader. Because of the lack of portability of card readers, in some cases the card must be handled by multiple individuals before the card authorization code is read.

For example, in a restaurant environment, the customer must first relinquish the card to a waiter or waitress who subsequently passes the card to the cashier. Often, the customer not only relinquishes physical possession of the card but also visual contact with the card. In such situations, the likelihood that the card will be misplaced or not returned to the customer increases.

Card transaction processing can also be very inefficient. For example, in a restaurant the primary function of a waiter or waitress is to explain the menu to the customer, take the customer's order and serve the order to the customer. However, once the customer finishes the meal the waiter or waitress must expend the time and effort to bring the check to the customer, collect the customer's card and carry the check and card to the cashier. The cashier must then obtain credit approval by sliding the card through a card reader and wait for a credit approval from a central facility. Since the customer has not, at this point, indicated the service tip, the total charge which needs to be authorized is unknown. Once credit approval is received, the waiter or waitress must now retrieve the credit slip and card from the cashier and bring both the credit slip and card to the customer's table. The customer must perform a computation to determine the appropriate tip amount, add the tip to the meal charge manually, and with luck sign the card slip and take only the customer copy of the card slip for his/her records. The waiter or waitress is expected to ensure that the customer's signs the card slip before leaving the restaurant. The signed card slip must now be returned by the waiter or waitress to the cashier who may be required to key in the amount of the tip so that it can be appropriately processed both from the standpoint of charging the customer as well as for purposes of paying the waiter or waitress the tip.

OBJECTIVES OF THE INVENTION

Accordingly, it would be beneficial if card purchases could be authorized without the purchaser relinquishing possession of his/her card. In, for example, a restaurant, it would be desirable for the waiter or waitress responsible for serving the customer not to be required to transport the customer's card to and from the cashier. It would also be beneficial if the tip or other addition amounts to be added by a customer to a basic charge amount could be included in the amount for which credit approval is obtained, i.e the additional amount should be established before approval of the charge is sought. Additionally, it would be advantageous if the customer could determine an appropriate tip amount without having to perform a mental or manual computation. These and other objectives are satisfied by the present invention.

The advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

SUMMARY OF THE INVENTION

In accordance with the present invention, a system for authorizing card purchases includes a portable, preferably hand held, unit which includes a card reader for reading a card authorization code from the storage medium on a customer's card. It should be understood that the phrase "card" is used in the broadest possible sense to mean any item which has a code stored thereon which corresponds to a credit account and can be used, in lieu of cash, to purchase goods and services. A keyboard for entering data, processor and memory storage are also included in the portable unit. The memory storage preferably has ROM for storing the programming required to drive the processor and RAM for temporarily storing charge information. The portable unit beneficially includes a display, for providing a visual indication of the charge amount to be applied against the card authorization code, and has a wireless transceiver, for exchanging information with a base unit, such as a cash register or a relay device. Typically, the portable unit will also include a printer for printing the charge amounts, the card authorization code and an authorization number on a charge slip.

If the base unit is a cash register, it will include a processor for generating a charge amount to be applied against the card authorization code. The base unit, notwithstanding the type, will include a communications port(s) which connects to a communications link for transmitting charge amount information and the card authorization code to a central computer, located for example at the point where card charges for the type of card being used by the customer are generally authorized, and receiving credit approval, including a credit approval code, which authorizes the charge amount to be applied against the card authorization code. It is also conceivable that the portable unit could communicate directly with the central computer via an appropriate communications link such as a direct satellite link.

In operation, a charge amount to be applied against the customer's card authorization code is generated. This amount could, for example be the cost of meal served in a restaurant. If the charge amount is generated by the base unit, such as a cash register, the portable unit is removably mounted to the base unit and the charge amount is thereby transferred, via a suitable connector, from the base unit to the RAM memory of the portable unit. Alternatively, the base unit might transfer generated charge information to the portable unit by a wireless communications link.

The portable unit is then handed to the customer so the customer can review the charge amount on the display and/or a printed sales slip which has been inserted in the portable unit. If desired, the customer can identify an amount, for example a tip, to be added to the stored charge amount using the key pad, which if desired could include a slider, to input the desired tip amount. In such a case, the processor of the portable unit, driven by the programming stored in ROM, adds the identified amount to the stored charge amount and thereby generates a total charge amount.

The customer now places a card against which the charge is to be applied, in the card reader of the portable unit. The reader is directed by the processor in accordance with programming instructions stored in ROM, to read the card authorization code from the card. Typically, this is performed by reading data stored on a magnetic strip on the back of the card. The portable unit's processor next operates to cause the unit's wireless transceiver to transmit the card authorization code and the total charge amount to the base unit.

The wireless transceiver of the base unit receives the transmitted charge amount and card authorization code. Responsive to receipt of this information, the base unit transmits the charge amount and the received card authorization code from the communications port to the central computer via the communications link to obtain authorization to apply the charge amount against the card authorization code. Upon receipt of a reply from the central computer, the base unit operates to cause its wireless transceiver to transmit credit approval or denial to the portable unit. If credit is approved, the reply from the central computer will typically also include a credit approval code which identifies the approval authority. The credit approval code is also transmitted with the approval by the base unit wireless transceiver to the portable unit. The wireless transceiver of the portable unit receives the information transmitted from the base unit. If credit approval is indicated, the unit's processor, driven by the programming stored in ROM, processes this information and causes the printer to complete the credit slip by, for example, printing the total charge, including tip, the credit approval code and a signature line on the credit slip. The customer may now sign the card slip, removing at least one copy for his/her own records to complete the transaction.

DESCRIPTION OF THE PREFERRED EMBODIMENT

Figure 1:
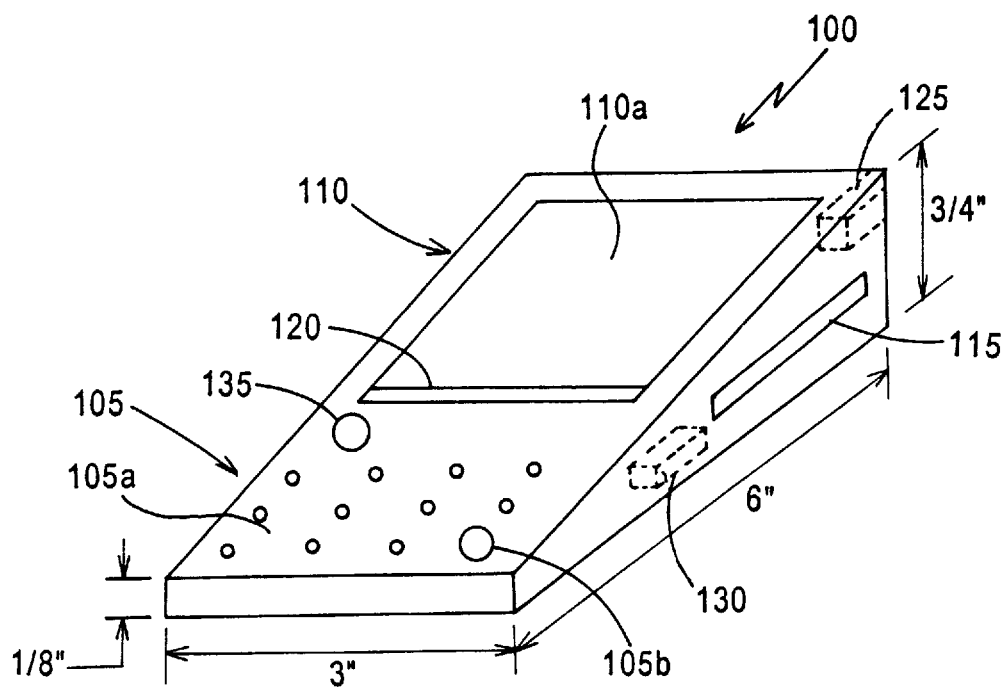
FIG. 1 is a perspective view of the portable card authorizer in accordance with the present invention.

FIG. 1 depicts a portable card authorizer 100 in accordance with the present invention. The portable authorizer 100 includes a key pad portion 105 and a display portion 110. A card slot 115 is provided to allow the card to be slid in and out of the unit so that the card authorization code stored, for example, on a magnetic strip on the back of the card can be read.

A paper slot 120 is provided on the upper surface of the portable authorizer 100 to allow a credit slip to egress and be removed from the authorizer. The key pad 105a includes an enter key 105b for entering commands on the portable authorizer 100. Each of the other keys will include at least a numeric function but could include other functions also. For example, these keys may be used to enter a tip amount either as an absolute dollar amount or as a percentage of a basic charge which is shown on the display 100a and/or a credit slip passing through slot 120. For example, a 15% tip might be indicated by the customer by pressing respective keys having 1 and 5 printed thereon and then pressing the enter key 105b. The enter key might be pressed a second time to indicate a total charge, including the tip amount, shown on display 110a is acceptable, thus authorizing further processing of the transaction.

The portable authorizer also includes a transceiver 125 which allows wireless communications between the portable authorizer and a cash register or central computer via a relay as will be described in more detail below. A battery 130 provides power to the unit. If desired the battery 130 of FIG. 1 may be rechargeable. The battery 130 could, if desired be replaced by a titanium capacitor which receives its charge from the register 900 while the portable authorizer 100 is temporarily attached to the register 900.

Figure 2:
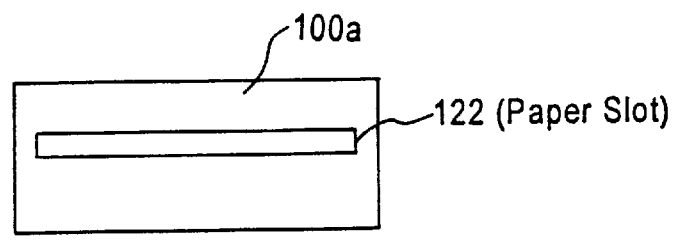
FIG. 2 is a rear view, with optional rear slot, of the portable card authorizer as depicted in FIG. 1.

As shown, the portable authorizer unit 100 preferably has a length of 6 inches and a width of 3 inches. The top face of the unit 100 is sloped to provide a more user-friendly surface for entering information on the keyboard and reading information from the display. Accordingly, the authorizer thickness varies from 1/8 to 3/4 inches. The portable authorizer, as shown, can be easily hand-held by the customer during operation. An indicator 135 is shown in the top surface of the authorizer unit 100. The indicator 135 might, for example, be a light source to provide a visual indication or a beeper to provide an audible indication that the credit slip has been signed and/or removed from slot 120. This will provide notice to the waiter or waitress to return to the customer's table to retrieve the portable authorizer 100 and credit slip. At this time, the waiter or waitress can ensure that the credit slip has been properly signed and that the customer's card has not been left on the table or in the authorizer unit 100. FIG. 2 shows the back surface 100a of the portable authorizer 100. As depicted, an optional slot 122 is provided for inserting a credit slip into the authorizer unit 100. It will be understood that this slot, if desired, could be eliminated as will be discussed further below.

Figure 3:
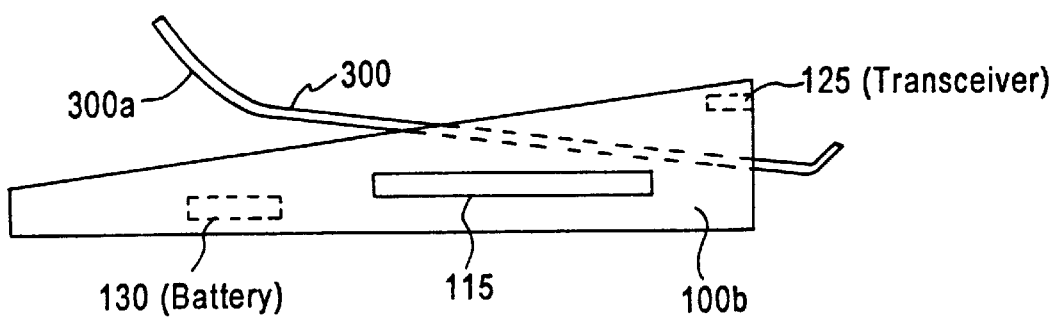
FIG. 3 is a side view of the portable card authorizer as depicted in FIG. 1.

FIG. 3 depicts the right-side surface 100b of the portable authorizer 100. A credit slip 300 is shown as it might appear when the authorizer unit 100 is brought to the customer's table. Credit slip 300, as shown, has been inserted through the paper slot 122 shown in FIG. 2. The slip 300 is slid through a portion of the unit and partially through slot 120 shown in FIG. 1. The exposed portion of the credit slip 300 which has passed through slot 120 has the basic charges which are to be applied against the customer's card authorization code printed on side 300a thereof. Accordingly, the customer may review the charges printed on the credit slip 300. As will be discussed in more detail below, the charges are also preferably stored on RAM memory which is included in the portable authorizer and displayed on the display 100a. Accordingly, the customer may also review the charges from the display 110a. If the basic charge is acceptable, the customer may be asked by a prompt on the display 110 to press the enter button 105b. The customer may then be prompted by an indication on the display 100a to enter a tip amount which, as discussed above, may be a percentage amount or absolute dollar amount. In any case, the customer enters the desired amounts by manipulating the numeric keys on the key pad 105a and then pressing the enter button 105b. As will be discussed further below, the portable authorizer 100 processes this information to generate a total charge amount. The portable authorizer may also be equipped with known anti-theft alarm capabilities to prevent a customer from accidentally leaving the restaurant with the portable authorizer still in his possession.

Figure 4:
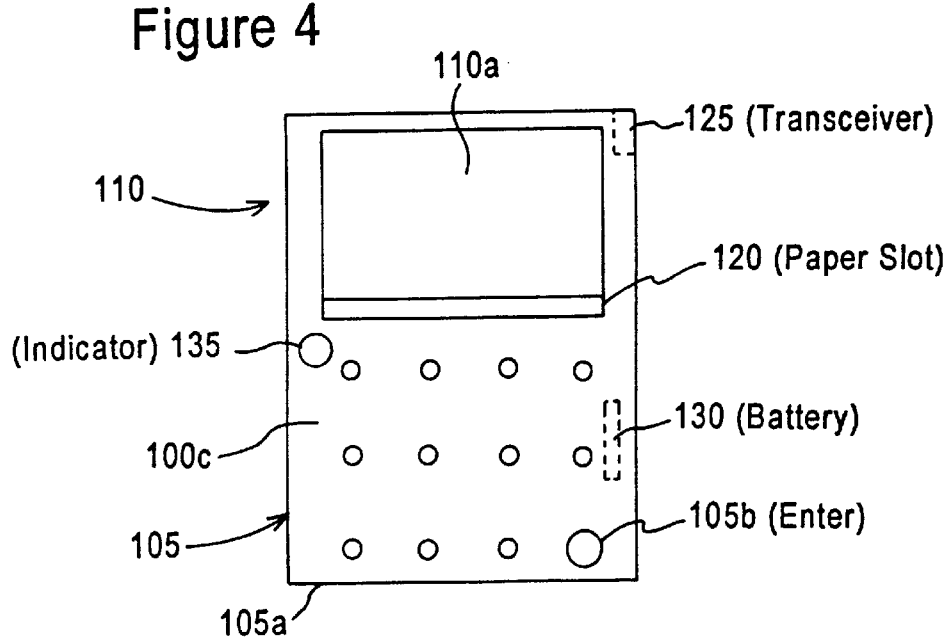
FIG. 4 is a top view of the portable card authorizer as depicted in FIG. 1.

FIG. 4 is a top view of the portable authorizer 100 depicting surface 100c of the authorizer unit 100. The various features depicted in FIG. 4 have been discussed previously in connection with the description of FIG. 1 and accordingly will not be reiterated.

Figure 5:
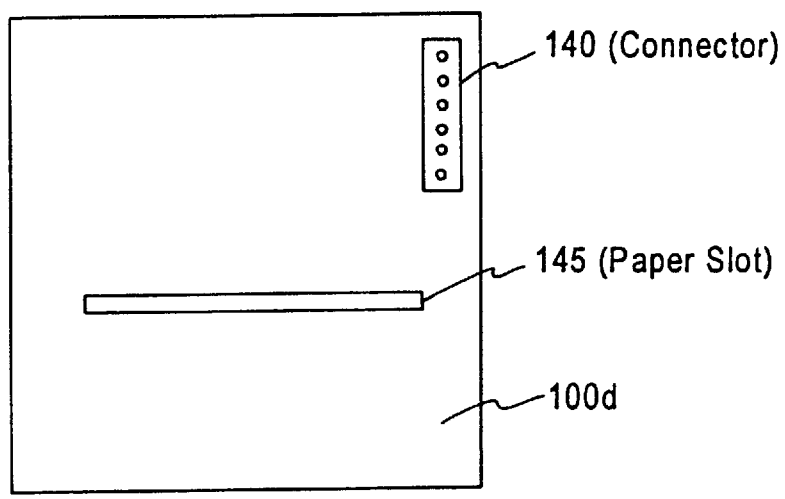
FIG. 5 is a bottom view, with optional bottom slot, of the portable card authorizer as depicted in FIG. 1.

FIG. 5 depicts bottom surface 100d of the authorizer unit 100 of FIG. 1. As shown, a connector 140 is optionally disposed in the bottom surface 100d of the portable authorizer 100. The connector 140 mates with a connector built into the cash register to form a hard-wired communication link to the base unit as will be described below. A paper slot 145 is further optionally provided in the bottom surface 100d of the portable authorizer 100 to allow a credit slip to pass directly from the base unit and into the portable authorizer as will also be further discussed below. Suffice it to say at this point that the connector 140 and slot 145 facilitate the transfer of charge information and the credit slip from a base unit to the portable authorizer while the portable authorizer is temporarily and removably attached to the base unit.

Figure 7:
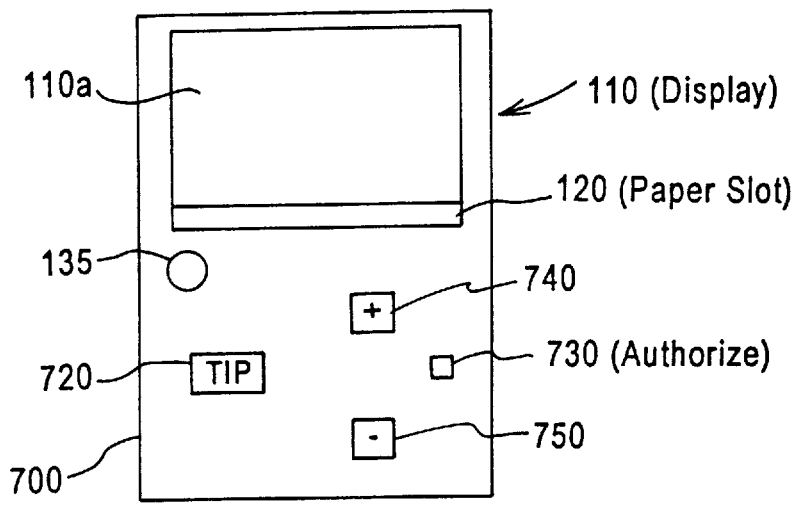
FIG. 7 is a top view of the portable card authorizer as depicted in FIG. 1 with another alternative key pad arrangement.
Figure 6:
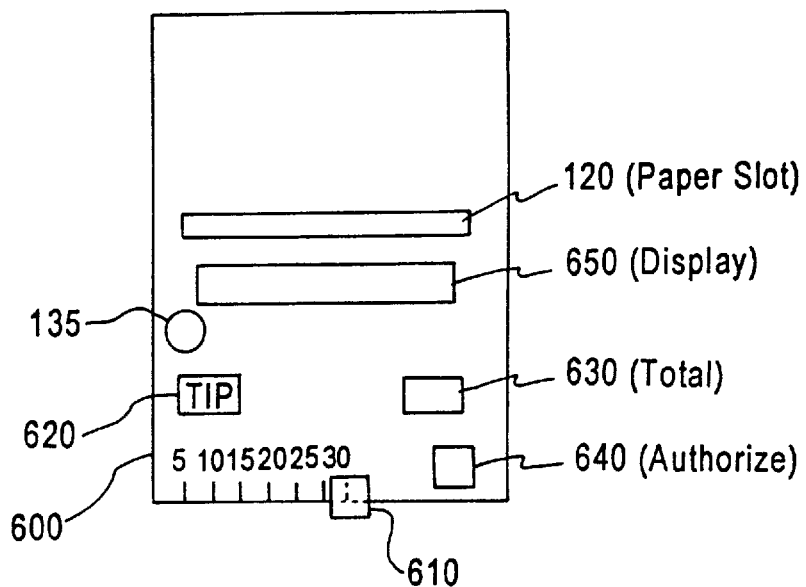
FIG. 6 is a top view of the portable card authorizer as depicted in FIG. 1 with an alternative key pad arrangement including a slider.
Figure 8:
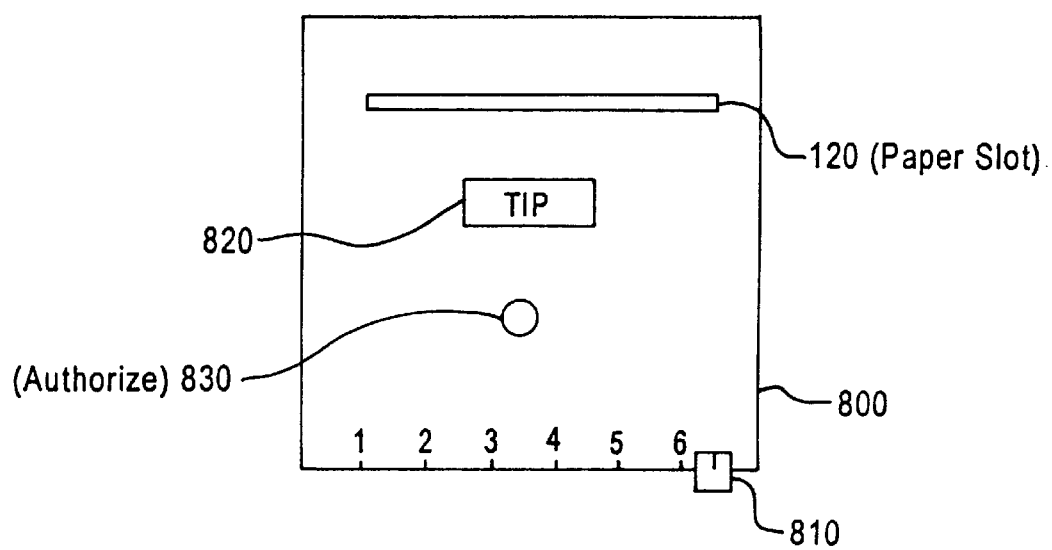
FIG. 8 is a top view of the portable card authorizer as depicted in FIG. 1 with still another alternative key pad arrangement including a slider.

FIGS. 6–8 depict various alternate key pad arrangements which can be substituted for that shown in FIG. 4. It should be understood that although certain alternate arrangements are depicted, numerous other arrangements are possible and may be desirable for the particular implementation. Accordingly, the key pad arrangements described herein are intended to be exemplary and not limiting.

Turning to FIG. 6, a key pad arrangement is depicted which reduces the number of keys required to enter a tip amount. More particularly, the key pad 600 includes a slider 610, a tip button 620, a total button 630 and an authorize button 640. It should also be noted that, as shown in FIG. 6, a reduced size display 650 is provided below the paper slot 120 through which the credit slip egresses from the portable authorizer. To use the key pad of FIG. 6, the user presses the tip button 620 and slides the slider 610 to the appropriate tip percentage. Although the tip percentages are indicated in increments of 5%, it should be understood that any desired increments or units, including monetary units, could be used. In any event, as the slider is moved across the noted percentages, the equivalent dollar amount of the tip is computed in a processor (described below) housed within the portable authorizer and indicated on the display 650. Once the desired tip setting has been made, the customer presses the total button 630 which totals the basic charge previously stored on the authorizer RAM and printed on the credit receipt extending through slot 120 as discussed above in connection with FIG. 3 and the selected tip amount. If the total amount indicated on the display 650 is acceptable, the customer presses the authorize button 640 to proceed with the processing of the transaction. A touch pad could be disposed in the area above the slot 120 to sense a pressure during the signing of the credit slip, responsive to which the indicator 135 would be activated. Alternatively, a pressure sensitive signature area could be disposed in this area and used to capture the customer's signature in electronic form. This could eliminate the need for any but the customer's paper copy. The electronic signature could be either stored in memory or printed on receipt copies.

The key pad 700 of FIG. 7 includes add/subtract keys 740/750 and an authorize key 730 in lieu of the slider 610 and total/authorize keys 630/640 of FIG. 6. As shown in FIG. 7, a display 110a identical to the display shown in FIG. 1 is utilized. To operate the key pad 700, the customer presses the tip key to indicate his/her desire to add a tip to the basic charge. The customer then presses the add key 740 which automatically generates a monetary amount beginning, for example, with one cent and continuing in one cent increments so long as the add key 740 is pressed, up to a pre-established maximum amount. The amount is indicated on the display 110a, which could also display a corresponding percentage value to indicate the relationship between the displayed tip amount and the basic charge. If the amount indicated on display 110a exceeds the desired tip amount, the customer can press the subtraction key 750, thereby reducing the tip amount indicated on display 110a in one cent intervals so long as key 750 is activated. Once the desired tip amount is indicated on display 110a, the customer presses the authorize key 730, responsive to which the indicated tip amount is automatically added to the basic charge and the total charge is indicated on display 110a. The customer may either be prompted to again press the authorize button 730 to continue processing of the card transaction or this may be continued automatically after the total charge is indicated on the display 110a. It will be noted that the keys 740 and 750 could be replaced by a single toggle switch if desired.

A still further alternative key pad arrangement is shown in FIG. 8. The FIG. 8 key pad is a more simplified variation of the key pads described above. The key pad 800 includes a slider 810 which can be moved across the incremented percentage values indicated at the bottom of the key pad. The version shown might be suitable for use in Europe where a tip amount is generally included in the basic charge and the addition of a small percentage tip in the range of one to six percent is customary. The key pad 800 also includes a tip button 820 and an authorize button 830. It will be noted that, as shown, no display is provided and accordingly, all charges must be read directly from the credit slip which egresses the portable authorizer via slot 120.

To use the key pad 800, the customer presses the tip key 820 and then moves the slider 810 across the bottom edge of the key pad 800 to the location which denotes the desired tip percentage amount. The customer then presses the authorize button 830 to authorize the tip to be added to the basic charge. The tip amount and total charge will be printed on the credit slip which will be advanced through the slot 120 so all newly printed amounts can be reviewed by the customer prior to continuing the card transaction processing.

Figure 9:
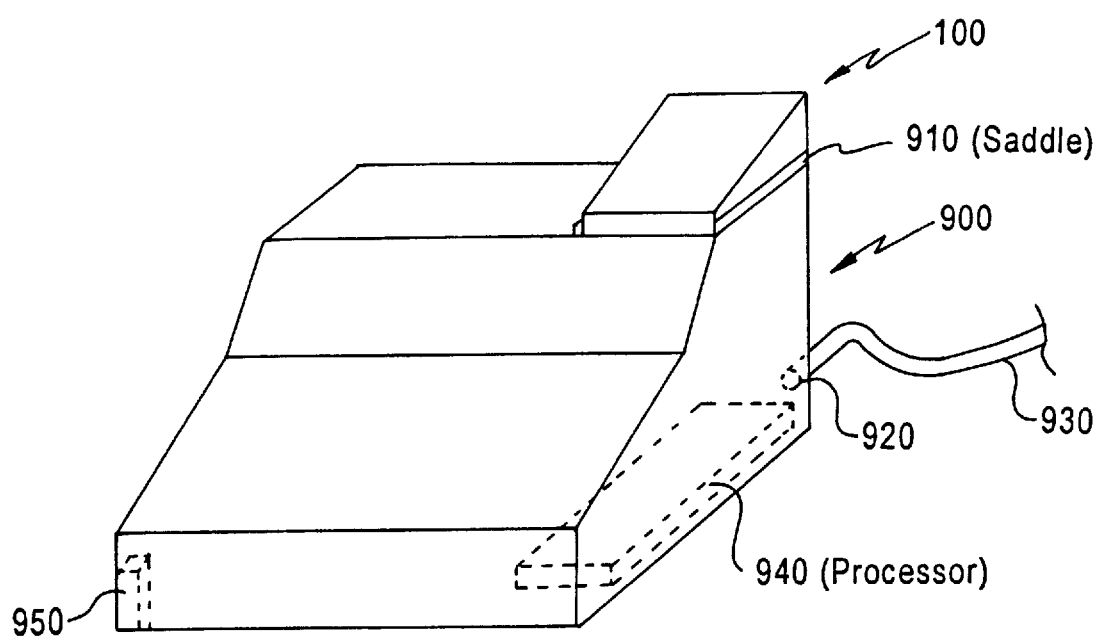
FIG. 9 is a perspective view of the portable card authorizer as depicted in FIG. 1 mounted on a cash register in accordance with the present invention.

FIG. 9 shows the portable authorizer 100 mounted to a cash register 900 via a saddle or holster 910 formed on a upper surface of the register 900. As shown, the register also includes a communications port 920 which is connected via a communications cable 930 to a network such that communications can be maintained with a central computer used to authorize or disallow charges against a customer's card.

As discussed above with the portable authorizer 100 temporarily mounted on the register 900, the connector 140 of FIG. 5 mates with a connector built into the register 900. This connector allows charge amount information, which will include any associated taxes, generated in the register by the processor 940 to be transferred to the portable authorizer 100. The register 900 beneficially also receives the serial number of the authorizer 100 via the connector 140 of FIG. 5 while the authorizer is temporarily attached to the register 900. The serial number may be stored on in the authorizer 100 in ROM 170*a*. The register also includes a transceiver 950 which is capable of transmitting signals to and receiving signals transmitted from transceiver 125 shown in FIG. 1.

Figure 10:
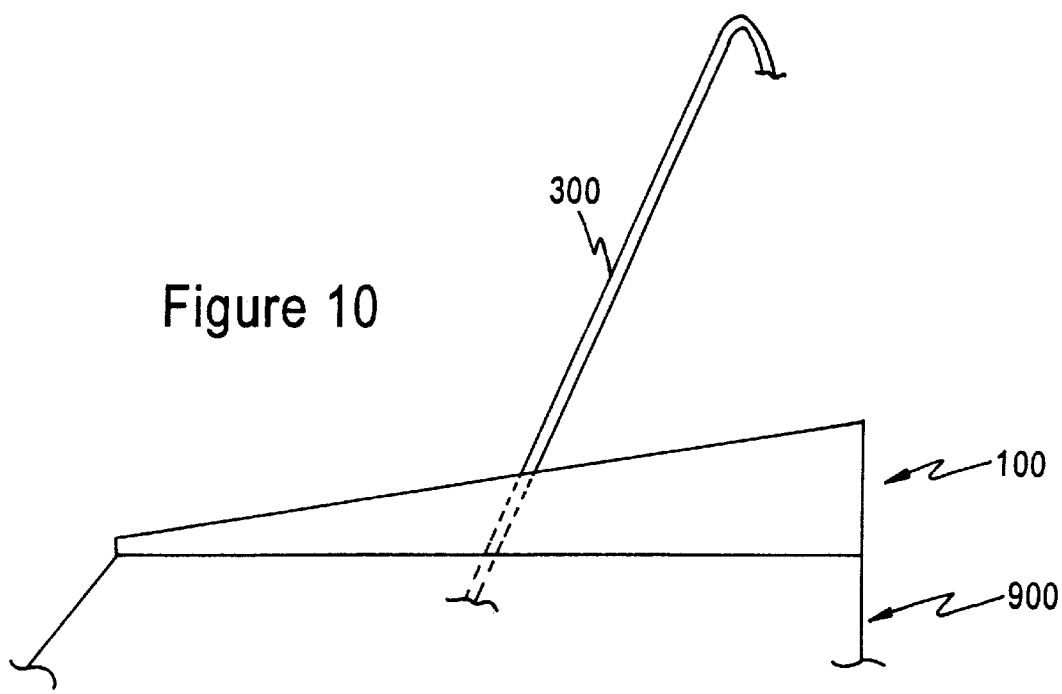
FIG. 10 is a side view of the portable card authorizer as depicted in FIG. 9 showing a receipt path from the register in accordance with aspects of the invention.

FIG. 10 illustrates the path of the charge slip 300 as it passes from the register 900 through the portable authorizer 100 while the portable authorizer 100 is temporarily mounted to the register 900. The charge slip passes through a slot (not shown) in the top surface of the register 900 and directly into the optional slot 145 in the bottom surface of the portable authorizer 100 as shown in FIG. 5. The charge slip preferably is guided through the portable authorizer housing and egresses through slot 120 in the top surface of the portable authorizer.

Accordingly, with the portable authorizer 100 temporarily mounted in the saddle 910 on the top of the register 900, the cashier keys into the register the basic charges for food and beverages ordered by the customer. These amounts are processed in the processor 940 and printed by a register printer (not shown) onto the charge slip 300 which is advanced through the portable authorizer 100 via slots 145 and 120. The charges are also electronically transferred via the connector 140 shown in FIG. 5 from the register 900 to the portable authorizer 100. In this manner, the register 900 processes the basic charges and prints the basic charges on a charge slip in the conventional manner.

If the saddle 910 is not located so as to allow the credit slip to pass directly from the register to the portable authorizer, the credit slip is removed from the cash register 900 and inserted into the portable authorizer through slot 122 in the back surface of the authorizer shown in FIG. 2. It should also be understood that, if desired, the basic charge could be directly keyed into the portable authorizer on a key pad of the type shown in FIG. 4. A programmed processor within the authorizer 100 could then generate the basic charge and direct the on-board printer to print the basic charge on a blank credit slip inserted in slot 122.

Figure 11:
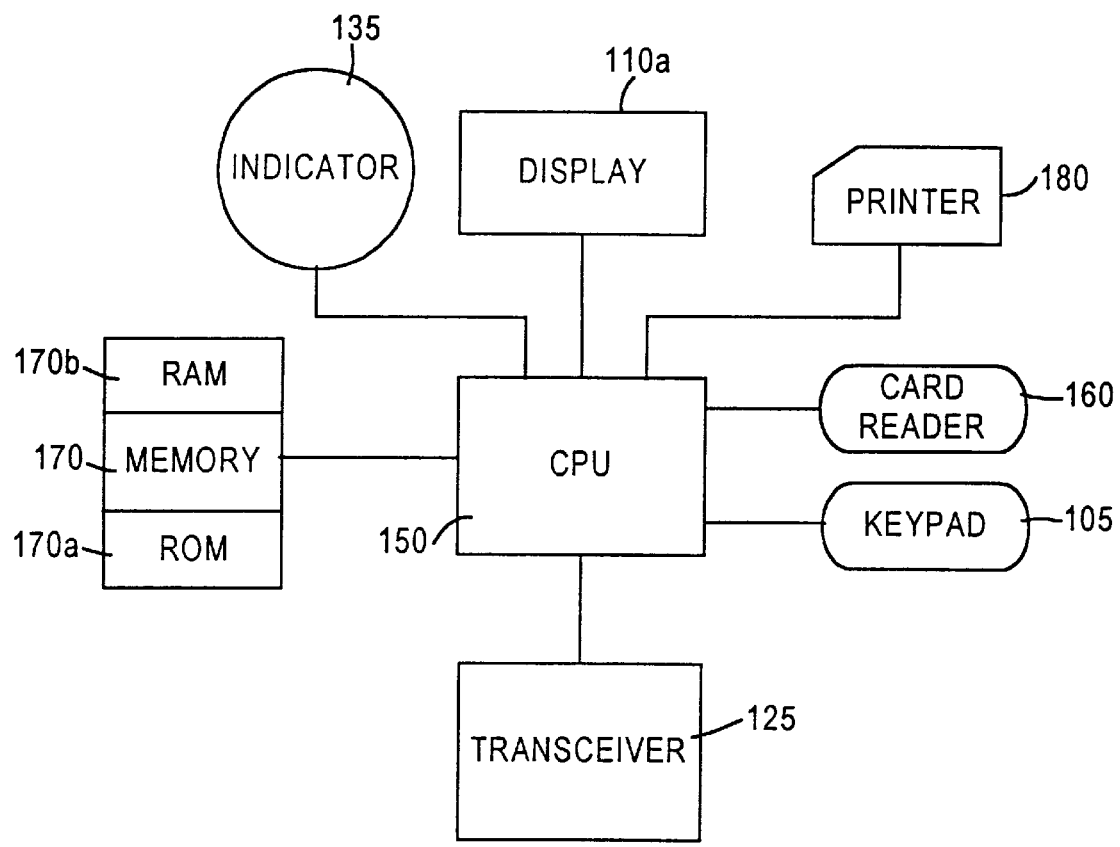
FIG. 11 is a block diagram of the components of the portable card authorizer as depicted in FIG. 1.

FIG. 11 depicts a block diagram of various components housed within the portable card authorizer 100. As shown, the portable authorizer includes a computer processing unit (CPU) 150, which is preferably a microprocessor, operatively connected to the previously described key pad 105*a*, display 110*a*, transceiver 125, which is preferably a microtransceiver, and indicator 135. Also housed within the portable authorizer and operatively connected to the processing unit 150 is a card reader 160 which is aligned with the slot 115 to read a card authorization code from a magnetic strip on the back of a card inserted into the slot. Memory 170 preferably includes read only memory (ROM) 170*a* on which is stored the computer programming which instructs the processing unit 150 to operate in accordance with the present invention. A random access memory (RAM) 170*b* is also beneficially provided to temporarily store charge information during transaction processing. The portable authorizer also includes a printer 180 driven by the CPU 150 in accordance with programming instructions stored in ROM. It will be understood that other types of memory including magnetic disk, compact disk (CD), SPAM, DRAM, EPROM, optical disk, etc., could be used in lieu of the ROM and/or RAM.

Referring to FIG. 9, the charge information generated by the processor 940 and transferred via connector 140 of FIG. 5 to the portable authorizer 100 is stored in the RAM 170*b*. Once the information has been printed by the register 900 onto the sales slip 300 and stored on RAM 170*b*, the portable unit is removed from the saddle 910 and thereby detached from the register 900. The portable authorizer is now handed over to the customer, who may, for example, remain seated at his/her table. The waiter or waitress need not wait for the customer to review the bill and provide his/her charge card but can simply proceed with serving other customers.

If desired, the programming stored in ROM can instruct the CPU to drive the display of the basic charge information on display 110*a*. The customer operates the key pad as previously described to identify the desired tip to be added to the basic charge. The CPU, in accordance with instructions from the programming stored in ROM 170*a*, displays on display 110*a* the tip amount in accordance with the customer's manipulation of the key pad 105*a*. Once the customer has authorized or indicated that the displayed tip amount is the desired amount, the CPU is instructed by the stored programming to add the tip amount to the basic charge and to display the total charge on display 100*a*. When the customer has indicated his acceptance of the total charge, the CPU, in accordance with further instructions from the stored programming, directs the printer to print the tip amount and total charge amount on the charge slip.

The user may now be prompted on the display, in accordance with instructions from the stored programming, to insert the desired card into the slot 115 shown in, for example, FIG. 1, so that the card authorization code can be read from the magnetic strip. The CPU 150, driven by the stored programming, directs the transceiver 125 to transmit both the total charge amount, which may be stored by the CPU on RAM 170*b* in accordance with the stored programming instructions, and the card authorization code read by the card reader 160 to the transceiver 950 in register 900. Preferably transceivers 125 and 950 are radio frequency transceivers although infrared or other types of wireless transmit/receive devices could be utilized if desired. The CPU also is instructed to store the card authorization code on the RAM 170b.

Figure 12:
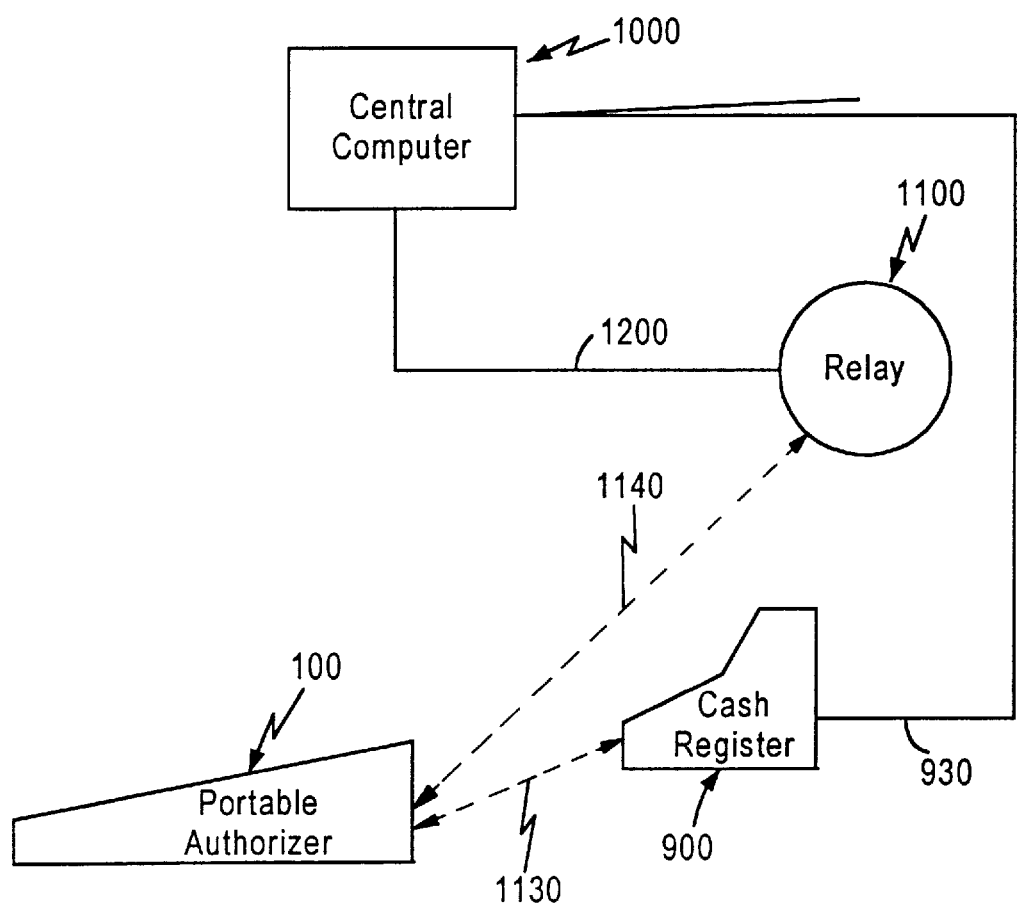
FIG. 12 depicts exemplary paths for communications with the portable card authorizer depicted in FIG. 1 in accordance with the present invention.

Turning now to FIG. 12, the transceiver 125 of FIG. 11 transmits the total charge and authorization code information to the cash register 900 via a wireless communication link 1130. The transmitted information is received by the register transceiver 950 shown in FIG. 9. The received information is then output via communications port 920 as shown in FIG. 9 and transmitted via communications link 930 to a central computer 1000 which is located at the point where card transactions for the type of card being utilized by the customer are approved or denied. The central computer 1000 transmits back to the register 900 via link 930 an approval or denial of the card charge. If the charge is approved, an approval code identifying the approving authority for the transaction is also transmitted back to the register 900 via communications link 930. The transmitted information received by register 900 via communications port 920 is retransmitted by the register 900 via the transceiver 950 over wireless communication link 1130 to the portable authorizer 100.

The transceiver 125 receives the information transmitted from the cash register 900. The received information is processed by the CPU 150 in accordance with the programming instructions stored in ROM 170a. If credit approval has been given, the CPU 150, in accordance with the stored programming instructions, directs the printer 180 to print the card authorization code, the approval code and a signature line on the credit slip. Otherwise, the CPU 150 is instructed by the stored programming to direct the display of a no approval indicator on the display 110a. Once approval has been given, the credit slip is advanced to a point where the credit slip can be either signed with a bottom portion of the slip still held within slot 120 or can be removed from the slot 120 before signing by the customer. A sensor (not shown) may be provided to sense either the removal of the entire credit slip or the customer copy of the credit slip from the slot 120, responsive to which the programming stored in ROM 170a instructs the CPU to drive the indicator 135 to provide a aural or visual indication that the credit slip has been removed from the portable authorizer. Alternatively, if the credit slip remains in slot 120 during signature, as discussed above a touch pad may be used to sense pressure during execution of the credit slip.

FIG. 12 further depicts an alternative routing for communications to and from the portable authorizer. As depicted, rather than transmitting the total charge amount and card authorization code back through the cash register, the transceiver 125 may transmit this information via a wireless communications link 1140 to a relay 1100 which then further transmits this information to the central computer via communications link 1200. The reverse path would likewise be over links 1200 and 1140 back to the portable authorizer 100. This arrangement avoids the need for wireless communication links between the portable authorizer 100 and cash register 900.

The CPU 150, if desired, could be instructed to by the programming stored in ROM 170a to direct the reading of the card authorization code before rather than after the total charge has been authorized by the customer. The CPU 150 may also be instructed by the stored programming to generate queries and drive the display 100a to display the queries for each step which is required to be performed by the customer to complete the card transaction.

The indicator 135 could alternatively transmit an radio, infrared or some other type signal to a receiver carried on the waiter's or waitress' person in lieu of or together with an audio/visual signal. A device could also be provided to activate the indicator 135 if it is being removed from the premises.

In accordance with other aspects of the invention, the customer may be prompted to electronically sign the credit slip using a touch pad. In accordance with the stored programming, the CPU 150 would then drive the printer 180 to print the customer's signature on the charge slip. Beneficially, the paper charge slip could be eliminated altogether by relying on memory storage of the displayed charge information, the customer's card authorization code, the approval code and the customer's electronic signature.

Figure 13:
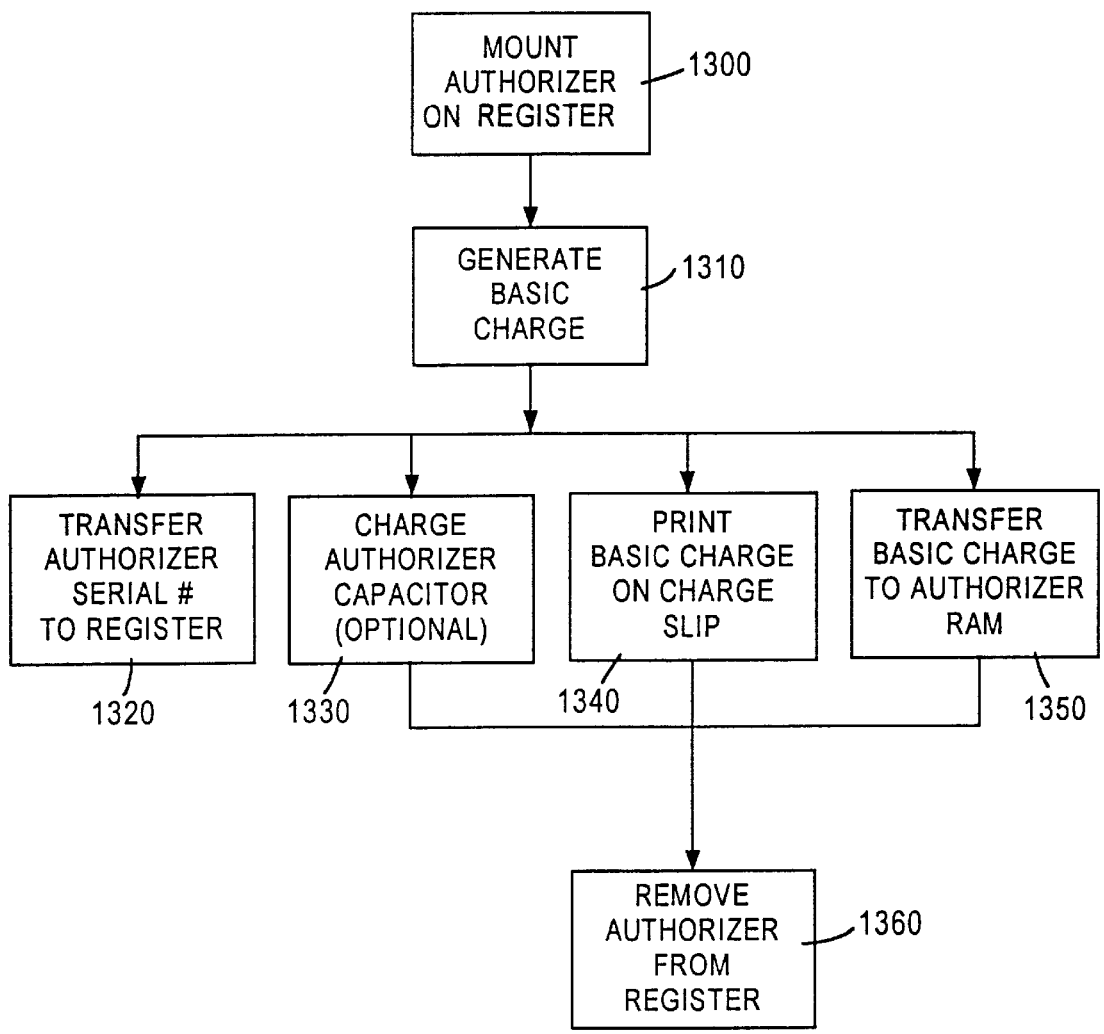
FIG. 13 is a flow diagram of steps performed with the portable card authorizer mounted to the cash register as shown in FIG. 9.

FIG. 13 is a flow diagram showing steps performed while the portable authorizer 100 is mounted to the register 900 as shown in FIG. 9. In step 1300, the authorizer 100 is mounted on the register 900 as previously described. In step 1310, the register 900 generates the basic charge from information typically keyed into the register by the cashier. In step 1320, the CPU 150 of the portable authorizer 100 retrieves the authorizer's serial number from the ROM 170a and directs the transmission of the serial number via the connector 140 to the cash register 900. In step 1330, if a titanium capacitor is utilized in lieu of the battery 130, it is charged by power supplied by the register 900. The register also prints the basic charge on the charge slip in step 1340 and transfers via the connector 140 the basic charge information to the portable authorizer 100. In accordance with the programming stored in ROM 170a, the CPU 150 is instructed to direct, in step 1350, the basic charge information to the RAM 170b for storage. In step 1360, the portable authorizer 100 is removed from the register 900. Accordingly, the authorizer 100 and register 900 are no longer operatively connected through connector 140.

Figure 14:
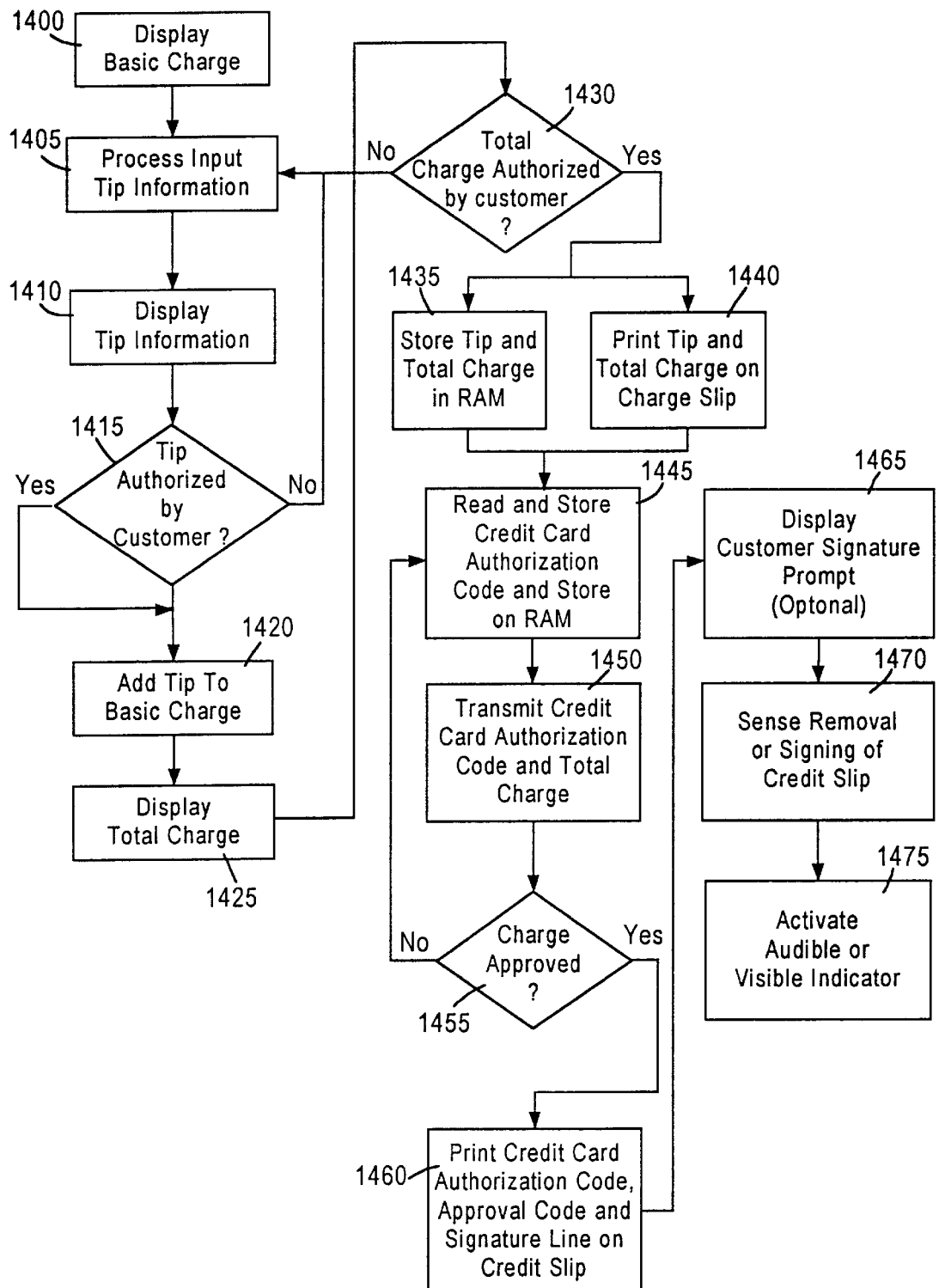
FIG. 14 is a flow diagram of the steps performed after completion of the steps shown in FIG. 13 and with the portable card authorizer separated from the cash register.

FIG. 14 is a flow diagram illustrating steps performed by the portable authorizer 100 after completion of the steps described in FIG. 13. In step 1400, the basic charge is displayed on the display 110a of the portable authorizer 100. In step 1405, input tip information is processed by the CPU 150 in accordance with the programming stored in ROM 170a. The CPU 150 is driven by the stored programming to display the tip information in step 1410.

If the displayed tip is not authorized by the customer, the CPU, in accordance with the stored programming instructions, continues to process input tip information. If the displayed tip information is authorized, the processor 150 is directed by the programming instructions stored in ROM 170a to generate a total charge by retrieving the basic charge from the RAM 170b and adding it to the authorized tip. In step 1425, the CPU 150 drives the display 110a to provide an indication of the generated total charge, in accordance with the stored programming instructions. If the displayed total charge is not authorized by the customer in step 1430, the CPU 150 is instructed to continue to process tip information input by the customer.

If the total charge is authorized in step 1430, the CPU 150 is instructed by the stored programming to store the tip and total charge amount in the RAM 170b and to direct the printer 180 to print the tip and total charge on the charge slip. In step 1445, the CPU 150 is instructed by the stored programming to direct the card reader 160 to read the card authorization code from the magnetic strip on a card inserted in slot 115, and to direct the storage of the authorization code on the RAM 170*b*. The stored programming next instructs the CPU in step 1450 to direct the transceiver 125 to transmit the card authorization code and total charge.

If the charge is not approved in step 1455, the stored programming instructs the CPU to return to step 1455. If the charge is approved in step 1455, in the manner previously described, the programming stored in ROM 170*a* instructs the CPU to drive the printer 180 to print the charge card authorization code, charge approval code and a signature line on the credit slip. Optionally, in step 1465, a prompt is displayed indicating to the customer that he/she should now remove and/or sign the credit slip. In step 1470, removal or signing of the credit slip is sensed, responsive to which the CPU, in accordance with the stored programming instructions, drives the indicator 135 to provide an audible and/or visible indicator to indicate to the waiter/waitress that the transaction has been completed or will be completed momentary.

As described, using the present invention card purchases can be authorized without the purchaser relinquishing possession of his/her card. In, for example, a restaurant, the waiter or waitress responsible for serving the customer is not required to transport the customer's card to and from the cashier. The tip or other addition amounts added by the customer to the basic charge amount can be established before approval of the charge is sought. No math needs be performed by the customer to determine the desired tip amount.

It will also be recognized by those skilled in the art that, while the invention has been described above in terms of preferred embodiments it is not limited thereto. Various features and aspects of the above described invention may be used individually or jointly. Further, although the invention has been described in the context of their use in a particular environment, i.e. a restaurant, those skilled in the art will recognize that the present invention can be beneficially utilized in any environment in which purchases are made by card. Accordingly, the claims set forth below should be construed in view of the full breath and spirit of the invention as disclosed herein.

What is claimed:

1. A portable unit for authorizing card purchases, comprising:

a card reader;

a wireless transceiver configured to transmit a card authorization request and receiving a card transaction approval; and an alert mechanism for informing a service person that a card transaction has been completed in which said alert mechanism is activated when a signature to a document is applied.

\* \* \* \* \*